US008601155B2

(12) United States Patent  (10) Patent No.: US 8,601,155 B2
Toombs et al.  (45) Date of Patent: Dec. 3, 2013

(54) TELEMETRY STREAM PERFORMANCE ANALYSIS AND OPTIMIZATION

(75) Inventors: Douglas Toombs, Ashburn, VA (US); Jon D. Greaves, Longmont, CO (US)

(73) Assignee: Oracle America, Inc., Redwood City, CA (US)

( * ) Notice: Subject to any disclaimer, the term of this patent is extended or adjusted under 35 U.S.C. 154(b) by 2151 days.

(21) Appl. No.: 11/465,008

(22) Filed: Aug. 16, 2006

(65) Prior Publication Data

US 2008/0043716 A1   Feb. 21, 2008

(51) Int. Cl.
  *G06F 15/16*  (2006.01)
(52) U.S. Cl.
  USPC .............................. 709/238; 709/206; 710/38
(58) Field of Classification Search
  USPC .......................................................... 709/238
  See application file for complete search history.

(56) References Cited

U.S. PATENT DOCUMENTS

| | | | |
|---|---|---|---|
| 6,006,264 A | 12/1999 | Colby et al. | |
| 6,549,937 B1 * | 4/2003 | Auerbach et al. | 709/206 |
| 6,757,256 B1 | 6/2004 | Anandakumar et al. | |
| 6,789,141 B2 * | 9/2004 | Ayukawa et al. | 710/38 |
| 6,862,624 B2 | 3/2005 | Colby et al. | |
| 7,035,655 B2 | 4/2006 | Maggenti et al. | |
| 7,072,305 B1 | 7/2006 | Gregson | |
| 7,142,536 B1 | 11/2006 | Gossett et al. | |
| 2006/0062156 A1 | 3/2006 | Stultz et al. | |
| 2006/0153206 A1 * | 7/2006 | Erwin et al. | 370/401 |
| 2006/0206698 A1 * | 9/2006 | Foucher et al. | 713/1 |
| 2006/0233155 A1 | 10/2006 | Srivastava | |
| 2006/0245424 A1 | 11/2006 | Ramanathan et al. | |
| 2006/0268871 A1 | 11/2006 | Van Zijst | |
| 2006/0268933 A1 | 11/2006 | Kellerer et al. | |

* cited by examiner

*Primary Examiner* — Firmin Backer
*Assistant Examiner* — Natisha Cox
(74) *Attorney, Agent, or Firm* — Marsh Fischmann & Breyfogle, LLP; Kent A. Lembke

(57) ABSTRACT

A computer-based method for improving the timely delivery of telemetry or other application-to-application data. A telemetry routing table is stored in memory that includes entries for a plurality of communication pathways for delivering a telemetry message from a telemetry application running on a first computer system to a telemetry reception application running on a second computer system. The table entries include a latency and a measured data delivery rate for transmittal of data over the corresponding pathway. The method includes generating a telemetry message having a particular data payload using the telemetry application and then selecting one of the communication pathways using the telemetry application based on a size of the data payload, the latencies, and the data delivery rates for the pathways (e.g., determining a total transit time for the payload for each pathway and selecting the pathway corresponding to the shortest transit time).

19 Claims, 6 Drawing Sheets

TELEMETRY STREAM PERFORMANCE ANALYSIS AND OPTIMIZATION

BACKGROUND OF THE INVENTION

1. Field of the Invention

The present invention relates, in general, to communications and data transfer among computers and network nodes, and, more particularly, to software, hardware, and computer systems for analyzing communication performance between applications, such as telemetry data generation and reception/monitoring applications, running on networked computing devices and for managing data transfer between the applications to provide enhanced performance or maintain desired levels of performance.

2. Relevant Background

In today's society, a huge amount of digital data is transferred over communications networks that may be made up of local area networks (LANs), wide area networks (WANs), intranets, the Internet, other communication channels and networks, and any combination of such networks. For network designers and operators and for those using these networks for the transfer of their messages and data, an ongoing and difficult problem is how to control communications over these complicated networks to obtain not only predictable and secure communications but also so as to achieve the most prompt delivery of the message or data. In other words, it is often important that the information transmitted from an application or computing device be received in a timely manner by another application or computing device.

There are numerous sources of latency (i.e., time delay or the time it takes to get information through a network) and/or slow throughput in digital communications networks. Often congestion may occur in the middle transport or public network portion of the network between two communicating applications. However, congestion also may occur on the portions of the network that are within the control of the entities operating computer device or node running the source application and/or the target destination application. For example, congestion may occur on the LAN segment of the source device or occur on the WAN segment to which the source device connects (e.g., a pre-existing high utilization condition on a WAN link or the like). Additionally, the source network may use a WAN protocol that introduces latency such as would be the case if a high-overhead or high-correction protocol (e.g., the X.25 protocol). Further, general WAN latency may be experienced by a connection or channel selected by the source application due to multi-hop Internet pathways, committed information rates of variable network types such as Frame Relay Committed Information Rate (CIR), efficiency of connection based on values such as Maximum Transmission Unit (MTU), and fragmentation and retransmits experienced across a WAN path. Similarly, congestion and latency may be introduced within networks and/or communication channels under the control of operators or entities maintaining a destination network. For example, congestion may occur on the WAN segment of the target destination network or on the LAN segment of the destination network and/or host/system. Other causes of latency may be directly related to the source or destination application such as high operating system layer utilization bottlenecks on generating or processing a message or such as performance issues related to a particular source or target application.

Controlling or limiting latency and slow throughput on a network may be important in many cases where two applications need to communicate over a network. For example, a number of companies have developed systems in which they monitor operating computer systems by gathering telemetry data at a host or source system or network with a telemetry generation application, transferring this data over a communications network to another computer device linked to the network, and using a monitoring/analysis application to process the received telemetry data. These systems may be thought of as telemetry systems that collect and store telemetry data on behalf of their customers. During operation, the telemetry systems monitor generated or incoming data streams in real time for significant events and analyze the data using complex pattern recognition and statistical analysis formulas to predict possible faults. The nature and definition of telemetry data may vary but typically includes alarm messages or utilization statistics for which message sizes are typically only a few hundred bytes and may include large quantities of system configuration data that is transmitted in messages whose payloads can easily be several megabytes in sizes. A useful definition of telemetry data or messages may be any data or messages that may be polled, received, or analyzed regardless of its size that may provide benefit in terms of maintaining and/or increasing availability or performance of a particular computer device or system, e.g., any data collected from a source system by a source telemetry application for use in monitoring and/or analyzing performance of the source system.

In telemetry systems, telemetry data is considered time-sensitive data, and it is generally desirable to provide the fastest possible collection of the data at the source system and delivery of the data to a telemetry analysis system (e.g., an analysis application running on a node or device linked to a network). Ideally, a telemetry connection channel used to communicate the telemetry data between the source and analysis system (e.g., telemetry source and destination) should have adequate bandwidth, low latency, and zero or very low downtime. The value of the telemetry data collection process diminishes rapidly as delivery time to the destination increases. For example, for an online retailer, discovering that a critical event occurred in their environment or computer network/system and is having a financial impact (e.g., buyers cannot complete purchases and the like) to their revenue stream is highly valuable data that needs to be put to immediate use to correct a problem. In this case, a delay of even a few minutes or seconds may mean many lost sales, irritated customers, or worse. In another example, complex predictive modeling algorithms that are used in telemetry analysis may produce differing results if one or more data points are lost or delayed. This may result in a significant failure or operating problem in a computer system not being predicted prior to its occurrence or prior to a time when it may be prevented. In these and other similar application-to-application communication environments, the fastest possible delivery to data is often a critical factor in being able to use the data in a meaningful way.

Existing communication techniques generally involve a source application generating a message or data payload, selecting a source for the message, and transmitting the message with its data payload over a communications network. The source application has no control over the latency, bandwidth, and availability of the communication channels used to transmit the generated message. Hardware solutions are sometimes implemented by building LANs, WANs, and connections that provide desired latencies and bandwidths. However, congestion may still occur in such networks, and differing communication paths in the LANs, WANs, and connections between the source application and the connection to the middle transport such as the Internet may have differing transmission characteristics such as differing bandwidth and latency that result in data transmitted on such communication paths reaching the destination or target at differing throughput rates. Similar differences in throughput rates may occur at the destination or target system such as between a connection to the middle transport and the destination (e.g., in the destination LAN, WAN, or the like). Efforts have been made to enhance data transfer within the middle transport such as between routers. Such efforts typically include complex algorithms and counters implemented at lower layers of the data transfer protocol stack (e.g., in the network layer of the TCP/IP protocol stack). While improving communication rates and reliability within the middle transport such as the Internet, these efforts may still result in application-to-application communications varying significantly and having undesirable delays in message receipt by a target or destination application such as when a communication channel is out of service or when there is a problem within a source or destination system rather than in the public network.

Hence, there remains a need for improved methods and systems for optimizing network communications between two applications. Preferably, such methods and systems would be particularly well suited for analyzing and optimizing telemetry streams or telemetry signals transmitted from a telemetry generation application to a destination analysis application to enhance real time analysis of telemetry data.

SUMMARY OF THE INVENTION

To address the above and other problems, methods and systems are provided for monitoring and improving communication performance of one or more communication pathways between a source application and a target or destination application, such as a telemetry data generation application on a monitored system and a telemetry data reception or processing application on a remote or second system. Prior techniques typically addressed routing between routers or other devices in a middle transport such as the internet. In contrast, the methods and systems described herein recognize that there may be multiple exit paths from a source computer system and/or multiple delivery interfaces or connection points/paths at the destination computer system. By pairing the exit paths and the delivery interfaces, a number of possible communication pathways can be defined (such as by IP addresses for each part of the address or key). Message transmission data for each of these pathways such as latency and throughput is stored in a routing table, and the source application acts to select a "best" pathway for transmitting a message it is building or generating based on the size of the message or its payload and the latency and throughput values. For example, a total transit time for the message on each of the pathways may be determined and then the pathway with the smallest or shortest time may be chosen for use in transmitting the message between the source and the destination application. The destination application typically will process the received messages to determine latency and throughput (or other transmission parameters) and pass these back to the source application to allow the routing table to be kept current. In this manner, the source application is able to adapt to changing conditions at the source system, the destination system, and in the network(s) between the two applications to choose a communication pathway among multiple available pathways to achieve more timely delivery of time sensitive data payloads.

More particularly, a system is provided for controlling communications between two application (such as a telemetry data generation application and a telemetry data processing application or the like). The system includes a source application running on a first computer system and a destination application running on a second computer system linked via one or more networks to the first computer system. The system includes a routing table stored in memory that defines a plurality of routes for communications between the source application and the destination application. The routes are defined in the routing table by an exit path for the source application from the first computer system and by a delivery interface for the destination application at the second computer system. The source application is adapted to generate a message having a particular size and to select one of the routes for transmission of the message based on the size of the message and based on transmission performance parameters stored in the routing table for each of the routes. For example, these parameters may include throughput values (e.g., measured data delivery rates) and latency for each of the routes, and the source application may use the size of the message to determine a transit time for the throughput value and latency for each route. The source application may select the route having the smallest or shortest transit time. In some cases, the latency and throughput values are determined based on prior messages (test or otherwise) sent between the two applications over the particular route so as to provide experiential data and this data is generally periodically updated by sending test messages over the route or pathway when it is not regularly utilized.

According to another aspect of the invention, a telemetry communication method is provided that includes storing a telemetry routing table in memory. The routing table includes entries for a plurality of communication pathways for delivering a telemetry message from a telemetry application running on a first computer system to a telemetry reception application running on a second computer system. Each of these table entries includes a latency and a measured data delivery rate for transmittal of data over the corresponding pathway. The method further includes generating a telemetry message having a particular data payload using the telemetry application. The method also includes selecting one of the communication pathways using the telemetry application based on a size of the data payload, the latencies, and the data delivery rates for the pathways (e.g., determining a total transit time for the payload for each pathway and selecting the pathway corresponding to the shortest transit time). The method may further include periodically determining whether each of the communication pathways is available for data transmission and storing the determined availability in the entries of the routing table. Then, the telemetry application may perform the selecting by only considering the communication pathways having positive values for the determined availabilities. The method may also include using the telemetry reception application to receive the telemetry message, to determine a latency and throughput value for the utilized pathway for the telemetry message, and providing the determined information to the telemetry application for use in updating the corresponding entry in the routing table so as to keep the routing table more current.

DETAILED DESCRIPTION OF THE PREFERRED EMBODIMENTS

Figure 1:
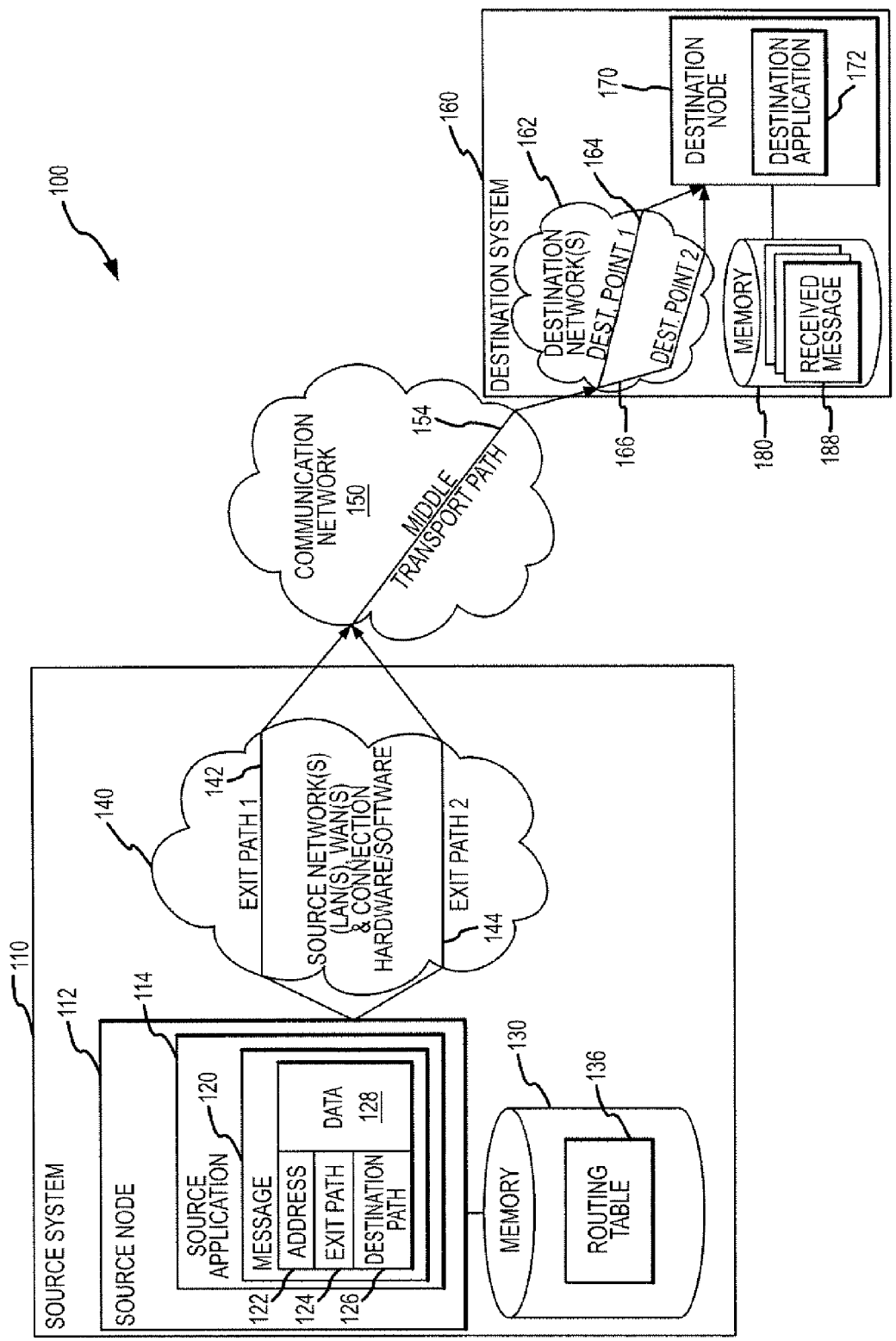
FIG. 1 illustrates in block form a system adapted for monitoring and controlling application-to-application communications on a network according to one embodiment of the invention.

The present invention is directed to methods and systems for enhancing application-to-application communications over a network. The concepts of the invention are useful for nearly any applications that are running on network nodes or client devices and that communicate on an ongoing basis. The concepts are particularly well suited for enhancing the delivery of telemetry data streams or messages with telemetry data from a telemetry source to a destination telemetry data processing application. Hence, the following discussion emphasizes the use of the route or communication path selection processes and other inventive processes in improving telemetry data transfer, but this intended to be exemplary only and not limiting.

For the criticality of telemetry-based data, there has not previously been much attention given to the delivery path for telemetry data and optimizing such a path (e.g., by selecting a fastest route or the like). Based on the nature of telemetry data elements, some of the data can be delivered without regard to time. However, other telemetry data elements are preferably provided at the best (i.e. typically the fastest) delivery to a monitoring system as possible. The following description provides details for a self-optimizing, multi-path telemetry stream infrastructure that provides delivery of messages with improved timeliness because, in part, messages are often delivered on the fastest route available with the infrastructure also accounting for changing network conditions. In this regard, a telemetry stream analysis and optimization sub-system is provided in telemetry systems in some embodiments of the invention that is an application-level, end-to-end message delivery performance measurement system that combines with logic and interfaces to report on measured telemetry delivery metrics and to also adapt to fluctuating network and application layer conditions that may exist between the telemetry source and the receiving/monitoring application by selecting a "best" (e.g., expected fast) route or path for transmission of telemetry data.

Briefly, the sub-system maintains a real-time table of performance metrics for delivery of telemetry data across available network pathways or routes. The sub-system then optimizes payload delivery in real-time by actively selecting a particular one of the available network pathways or routes for each generated telemetry message. In this manner, telemetry messages are delivered to the telemetry monitoring system (e.g., the destination or receiving application) in a typically fastest or faster time when compared with systems in which the pathway is pre-selected or a default value. Such real-time and ongoing optimization may involve selecting the pathway or routing for a message based on the payload size of the message and/or a measured latency between the source of creation for the message to the destination point of the final message reception (i.e., from the generating application to the processing application for the data). In many cases, delayed reception of data such as telemetry data has tangible impacts (e.g., operation and financial impacts) for organizations such as may result from interruptions in business processes due to application, data, or system level failures. Prior attempts to address the need for improved data transfer across a network generally focused only on the physical and logical network layers but failed to recognize there are often multiple pathways available for a source application to transmit a message and/or that based on a message payload different pathways may provide faster data delivery. The systems and methods of the present invention moves the performance measurement and pathway selection to the top of the application, where the delivery metrics or numbers often matter the most, and can optimize delivery by considering multiple delivery pathways as needed in order to provide timely delivery of telemetry data or, in some embodiments, other application data.

To practice the invention, the computer, network, and data storage devices and systems may be any devices useful for providing the described functions, including well-known data processing and storage and communication devices and systems such as computer devices or nodes typically used as hosts in computer systems or networks with processing, memory, and input/output components, and server devices configured to generate and transmit digital data over a communications network. Data typically is communicated wired or wirelessly in digital format following standard communication and transfer protocols such as TCP/IP protocols and corresponding stack or layers of such a protocol, with the specific labels for such layers of a network protocol not being limiting but with much of the processes described herein occurring at higher or top layers such as those associated with the application layer of a convention network protocol.

FIG. 1 illustrates a computer system or network 100 that is adapted for monitoring the timeliness and other characteristics of communications between two applications that communicate over one or more wired and/or wireless networks and further adapted for allowing selection of communication paths, channels, or routes over such networks to obtain faster delivery of data payloads in messages (such as with a communications monitoring and optimization sub-system). As shown, the system 100 includes a sources systems or site 110 that is linked to a destination system or site 160 by a communications network 150 (such as the Internet or some other public or private network that provides a link for passing digital information between two systems, nodes, devices, or the like). The system 100 is shown in simplified fashion for ease of explanation with only one source system 110 and one destination system 160 but, of course, implementations of system 100 may include two or more sources 110 and/or two or more destination systems, nodes, or devices 160. The systems 110, 160 may be relatively simple configurations with only one or more network nodes or computing devices or may be relatively complex with numerous computing devices, a plurality of hardware and software devices, and/or network and communication hardware and software (e.g., such as would be found in a typically enterprise or business computer system).

The source system 110 includes at least one source node 112 that runs a source application 114. The source application 114 acts to generate a message 120 for transmittal over the communications network 150 to the destination system 160 and a destination node 170 on the system 160 that is running destination application 172. In other words, the message 120 is used to transfer data or payload 128 in message 120 from source application 114 to destination application 172 for its use and/or further processing. This may be thought of as application-to-application communications, and typically, in the system 100, the applications 114, 172 communicate on a regular basis and it is useful for the data 128 to be transferred in an efficient and timely manner. The message 120 also includes an address or routing 122, which includes not only a network address of the destination node 170 but instead includes an exit path 124 and a destination path 126.

As will be understood, communications between two computing or network nodes, such as node 112 and destination node 170, typically is not limited to one possible route or path. Instead, at the time a message 120 is generated, there are typically multiple routes or paths that the message may take as it leaves a source system 170, crosses a middle network 150, and within the destination system 160 containing the destination node 170. This is shown in FIG. 1 by the source system 110 including a source network or networks 140, which may include connection hardware/software and one or more LANs, WANs, intranets, or the like, and similarly the destination system 160 including a destination network or networks 162. Generally, the transfer of data through the communications network 150 is outside the control of the transmitting or source application 114 and is shown simply as a middle transport path 154. However, according to some embodiments of the invention, the source application 114 operates to provide the address or routing 122 to define a portion of the route or path that the message 120 will take when it is transmitted from the source node 114 to the destination node 170 for use by application 172.

To this end, the system 110 includes memory 130 that stores a routing table 136 which is accessible by the source application 114 during messaging processes. The routing table 136 generally includes a listing each available path through the source network 140 and destination network 162, which may be labeled as exit paths and destination points, respectively. More accurately, the routing table 136 typically has an entry for each complete route or path between the applications 114, 172 (e.g., nodes 112 and 170 in this case). These entries include each possible exit path and destination point/path combination. As shown, there are to exit paths 142, 144 through the source network 140 and two destination paths or points 164, 166 through the destination network 162 (e.g., the destination path may be defined by providing a destination point or particular address and, likewise, an exit path may be defined by providing a particular exit point or address for connecting with network 150). For each of these combinations, data transfer parameters that characterize or describe data transfer over the route or path are stored or provided, and these parameters may include latency, recently measured throughput or bandwidth, and/or other data transfer parameters. Further, each record may include an indication or field that indicates whether the route or path is presently in service or useable (e.g., as paths, connections, and the like may go down, be so congested as to be defined as not working, or otherwise be unavailable for message transfer).

During operation, the source application 114 accesses the routing table 136 to determine based on the values stored for these data transfer parameters an appropriate route or path for transmitting the message 120. In many cases, the route that likely will transfer the message and its data payload 128 most quickly will be selected but in some cases other criteria may be used. As will be discussed below, the time to deliver a message or transit time may be determined based on the size (e.g., total bytes) of the message 120 and/or data payload 128. After a determination is made of which route or path to use, the message 120 is modified to include the exit path 124 and destination path/point to define this route, and the message 120 is transmitted to the destination application 172. For example, the selected route may include the second available exit path 144 through the source network 140, the middle transport path 154, and first destination point 164 for node 170. In this example, the message 120 would be formed by source application 114 to include a network address in the exit path portion 124 defining exit path 144 and a network address in the destination path or point portion 126 defining destination point 164. In this manner, the source application 114 is able to actively select path or route for communicating data to the destination application 172 when multiple communication paths are available without having to rely on default or random path selection that often will not provide a desired message delivery performance. Memory 180 is provided in the destination system 160 for storing the received messages 188, and, as explained below, the destination application 172 may process the received message and measured receipt parameters to generate a feedback or maintenance message that is sent to the source application 114 to allow the source application to maintain the routing table 136 (e.g., to update latency and throughput values for a particular route or path between the two applications).

The ideas of the invention are particularly well suited for improving telemetry data transfers. Instead of relying on unconfirmed, untimely collection mechanisms that have no performance measurements or adaptive capabilities, the inventive methods and systems introduce the measurement, monitoring, and use of timing and performance metrics into both the telemetry stream and collection processes, which allows monitoring of the performance of the entire telemetry ecosystem. If multiple communication paths are available, the methods and systems of the invention typically also provide an ability to intelligently adapt to fluctuations in network and system conditions and to utilize the best possible (or at least expected better) path for any telemetry message based on communication latency and payload size at a given point in time (e.g., parameters measured on an ongoing, real time basis). Generally, in telemetry systems, a desired goal is to achieve the fastest delivery of any packet from one application to another across whatever transit mechanisms are available, and with this in mind, the monitoring and optimization sub-system of the invention typically determines the overall delivery time for transferring messages between a telemetry source application and a destination or analysis application and adapts to changing conditions by selecting a path for each message generated and transmitted by the source application. Such ongoing monitoring and adaptation in significant experience has shown that telemetry (and other connections) may become congested periodically or even be taken offline or otherwise be out of service (i.e., unavailable or not online), which can undesirably defer or delay telemetry data delivery for minutes or even hours causing unacceptable performance of the telemetry system (e.g., cannot predict or identify problems accurately without timely delivery of information from monitored systems). The systems and methods of the invention are also useful for facilitating maintenance operations in systems that have multiple exit paths and/or destination points as offline paths/points can be identified in the routing table and these routes including these paths or points can be avoided by the source application in an automated/adaptive manner.

Figure 2:
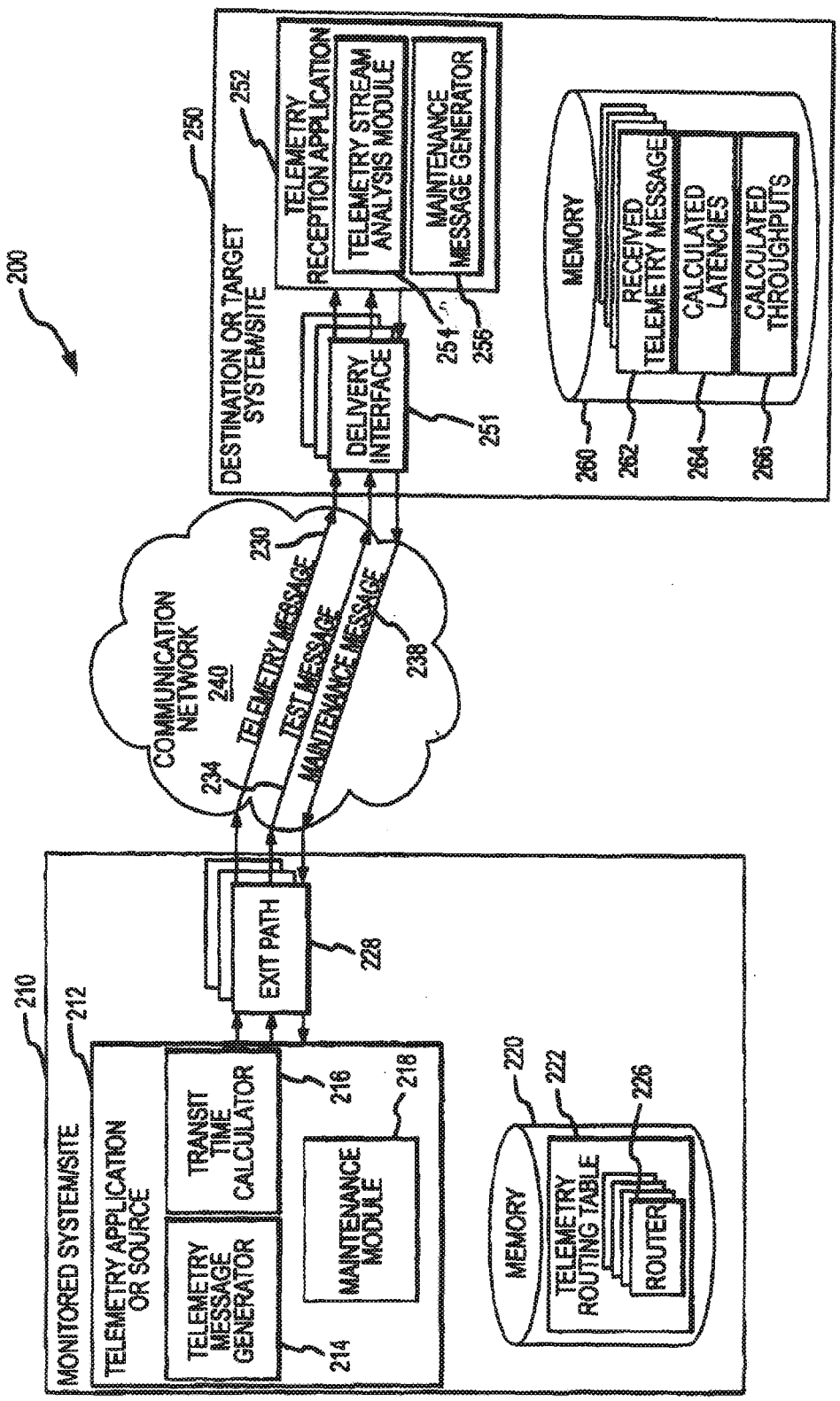
FIG. 2 illustrates in block diagram form a more specific embodiment of the system of FIG. 1 in which telemetry streams or messages containing telemetry data are monitored and transmitted on selective communication paths to achieve more timely telemetry reporting.

FIG. 2 illustrates a telemetry system 200 that includes a monitored system 210 or site linked to a destination or target system or site 250 via communications network (e.g., the Internet or the like) 240. The monitored system 210 is representative to a network or system of computer devices (e.g., servers, nodes, data storage systems, software, and the like) that may be monitored by a telemetry application or source 212, with the specific logic used to generate telemetry data (such as that included in a telemetry message 230) is not limiting to the invention as a wide range of telemetry applications may be used for the application 212. The destination system 250 runs a telemetry reception (and/or analysis) application 252 that includes logic for processing the telemetry data in message 230 and as with the telemetry application 212 the particular telemetry analysis logic used in the application 252 is not limiting to the invention as a wide variety of such logic is useful in the system 200 and benefits from timely delivery of telemetry data according to the invention.

The telemetry application 212 includes a telemetry message generator 214, a transit time calculator 216, and a maintenance module 218, which each may be implemented with software applications running on a computer and/or with hardware that provide the functionality described herein. The system 210 includes memory 220 accessible by the telemetry application 212 and storing a telemetry routing table 222 that includes records or entries for each available path or route 226 for transmitting messages 230 to telemetry reception applications such as application 252 running on target system 250. In this regard, the invention is particularly useful in systems 200 that provide more than one available communication path for transmitting messages from a telemetry application 212 to a reception application 252. This is shown by exit paths 228 provided in the monitored system 210 between the telemetry application and the communication network 240 and by delivery interface 251 that provides one or more destination points for telemetry messages 230 and test messages 234 to reach the telemetry reception application 252.

The telemetry message generator 214 functions to generate telemetry messages 230 that include data or a data payload and also include an address or route to the reception application 252 that is defined by a selection of one of the exit paths 228 and one of the delivery interfaces 251 (e.g., the exit path 228 may be thought of as a first part of a two part key and the destination point or delivery interface 251 as a second part of a two part key). The transit time calculator 216 processed data in the routing table 222 to provide the telemetry message generator 214 with transit times for a message (or its data payload) over each of the available routes defined in route records 226. The telemetry message generator 214 uses this information to select a "best" path or route such as by choosing the shortest or lowest value for transit time to achieve fast delivery of the message to the reception application 252. The address for the message then is added to the message by the generator 214 and includes an exit path 228 and a delivery interface or destination point 251 definition (i.e., IP network addresses defining the path 228 and the interface 251). The telemetry message 230 is then transmitted to the reception application 252 (e.g., by the message being passed to the presentation layer from the application layer in the network stack as shown in the FIG. 3).

The maintenance module 218 provides a number of functions (described below with reference to FIG. 6) that maintain the data in the routing table 222 to provide up-to-date or real time data such as which routes are online or available, recent throughput information, and recently measured latencies, and such maintenance is typically performed based on feedback or maintenance messages 238 received from a maintenance message generator 256 in the telemetry reception application 252. The maintenance message 238 may include latency and throughput data determined by a telemetry stream analysis module 254 (whose functionality is described below with respect to FIG. 5) for received telemetry messages 230 and test messages 234 (i.e., messages transmitted by the maintenance module 218 to test routes that have not been used recently (i.e., within a preset time period) for telemetry messages 230. The destination system 250 also includes memory 260 accessible by the telemetry reception application 252 to store received telemetry messages 262 for processing by telemetry analysis logic (not shown) and for processing by the telemetry stream analysis module 254 to calculate latencies and throughputs (and/or other transmission parameters) which are stored at 264 and 266 (at least temporarily until maintenance messages 238 including such information are generated by generator 256).

The systems of FIGS. 1 and 2 illustrate embodiments where there are two exit paths and two destination points in an effort to indicate the inventive methods and systems are useful for multiple exit paths and multiple destination paths or points. However, it should be understood at this point that there are a number of implementation models that may be used to optimize application-to-application communications over one or more networks. In the telemetry implementations, by multiplying the unique number of exit paths out of the telemetry generating device(s) by the unique number of delivery interfaces available to the telemetry monitoring system, a one-to-one, many-to-one, or many-to-many implementation model may be designed and the number of paths and delivery interfaces may vary over time, which can readily be accounted for by updating the routing tables used by the message generating module or application.

For example, a one-to-one (1:1) model may be used that does not provide path selection but does provide latency performance measurement. A one-to-many (1:M or one-to-two or more) model provides multi-destination best path routing. If multiple destination address points are available but only one source exit path, this 1:M model allows a telemetry generating application or source to choose the best or an identified better path for telemetry messages based on message size and the connection characteristics (e.g., latency, throughput, and/or other parameters) at any given point in time. This model does not provide redundancy on the source side of the telemetry system or network. If multiple source exit paths are available but only one destination address point, this M:1 model allows the telemetry generating application or source to choose the best path for telemetry messages out of the source system but does not provide redundancy at the destination system. In preferred embodiments, a many-to-many (M:M) or multi-source and multi-destination best path routing model allows for complete fault tolerance on both ends of the telemetry ecosystem. The M:M model also allows the telemetry message generator to achieve performance benefits by having at least four or more unique source/destination pairings to choose from for transmitting each individual message. This model can be extended to its fullest potential by providing multiple destination locations and not just multiple destination points at one location and each such destination location may have multiple delivery interfaces accepting telemetry messages.

Figure 3:
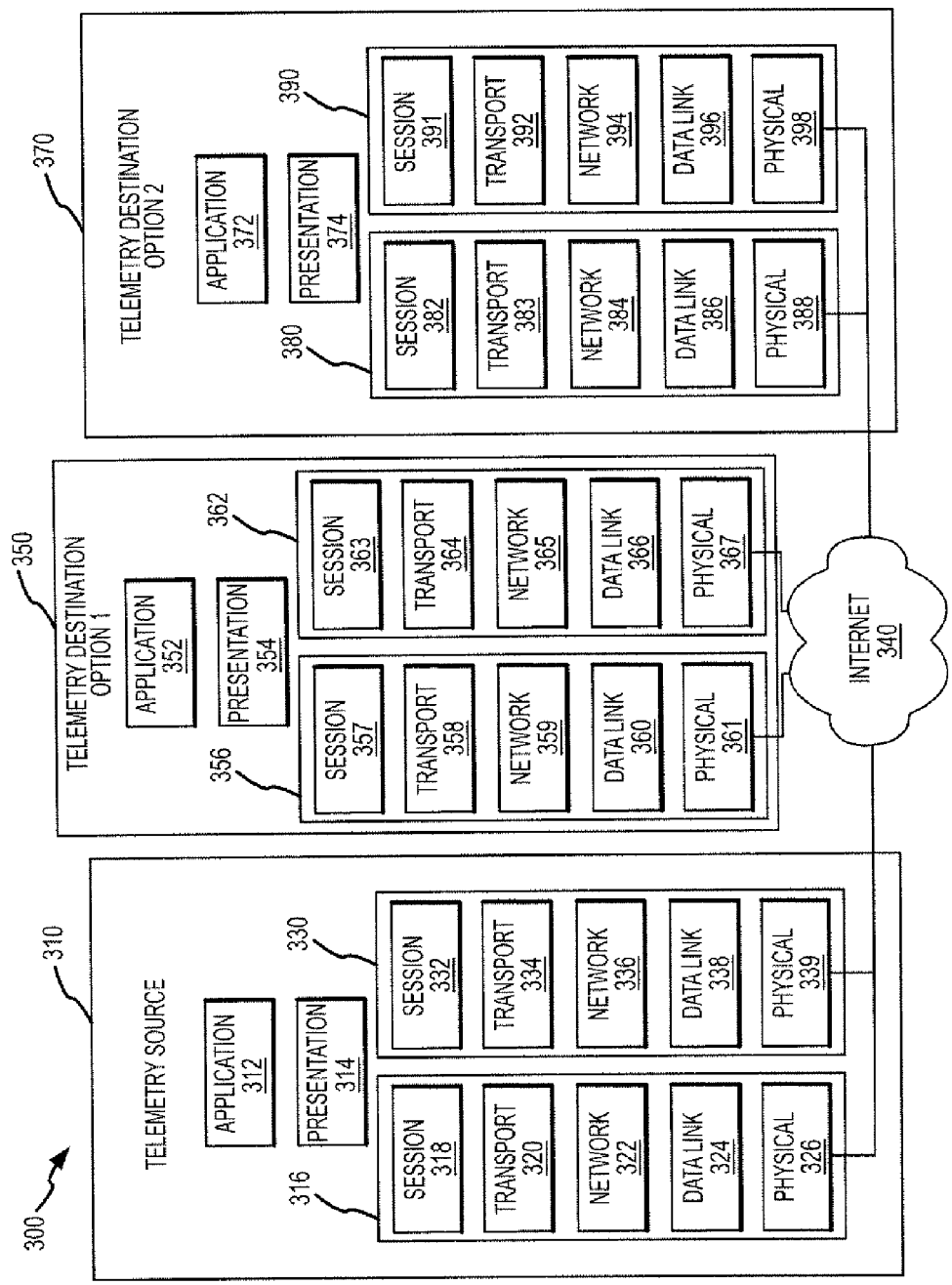
FIG. 3 illustrates yet another system for communicating telemetry data in a more timely manner and showing the protocol layers of the exit and destination routes or paths available for use for communicating the telemetry data.

One such M:M model is shown in the system 300 of FIG. 3, and in this system, there are eight unique pairings of source paths and destination points or interfaces that can be used as possible telemetry pathways for communicating between the source and target applications. The system 300 is drawn to show the layers of typical network communication stacks (such as TCP/IP protocol stacks). As shown, a telemetry system or source 310 is included that has a telemetry application 312 that generates telemetry messages and provides these messages to a presentation layer (i.e., layer 6 of the stack) for delivery on one of two exit paths 316, 330 that are each shown to include conventional protocol layers of session 318, 332, transport 320, 334, network 322, 336, data link 324, 338, and physical 326, 339. The representation of FIG. 3 is provided to emphasize that the communication optimization is occurring at the application 312 (and presentation 314) layers and not at lower layers such as the network 322, 336 layers as is more common in router-based processes used in networks.

In contrast, the application 312 acts to access a telemetry routing table (not shown in FIG. 3) to select one of the exit paths 316, 330 for transmitting a telemetry message over the network 340 to one of two telemetry destination locations 350 and 370. Further, each of the telemetry destinations 350, 370 is shown to include a telemetry analysis application 352, 372 that receives the telemetry messages from the presentation layer 354, 374 via one of two destination points or delivery interfaces 356, 362, 380, 390. Each of these delivery interfaces 356, 362, 380, 390 may be represented by a stack including a session layer 357, 363, 382, 391, a transport layer 358, 364, 383, 392, a network layer 359, 365, 384, 394, a data link layer 360, 366, 386, 396, and a physical layer 361, 367, 388, 398 that provides a connection to network 340. As shown, there are eight potential telemetry pathways that can be selected by the application 312 (or at the application layer) of telemetry source 310 for transmitting a message by defining pairs of the exit paths 316, 330 and the delivery interfaces or destination points 356, 362, 380, 390. In this manner, data transfer or telemetry streams are optimized or managed at the application or higher protocol layers in an ongoing and selective/adaptive manner (e.g., as described further below with reference to FIGS. 4-6) in a M:M environment.

Referring again to FIG. 2, the telemetry routing table 222 includes a number of records 224 for storing transmission characteristics and/or performance metrics for routes or telemetry pathways in the system 200. An exemplary routing table 222 is shown in Table 1. In Table 1, a record or entry is provided for each pathway that may be chosen by a telemetry message generator 214 for transmitting telemetry data to reception application 252. As shown, four entries or records (e.g., routes 224 of FIG. 2) are provided that define the pathways as pairs of exit paths and destination points, which in this example are in turn defined by network addresses (e.g., IP addresses) but this is not a requirement of the invention. As can be seen, there are two exit paths and two destination points or delivery interfaces which when combined provide four possible pathways for telemetry messages to be sent from the source application to the target application. For each of these exit path/destination point pairs, a most recently determined value for current latency (measured in milliseconds) and current throughput (measured in bytes per second) is provided. These values are typically determined by the maintenance module 218 based on maintenance message 238, which is provided by the maintenance message generator 256 of the telemetry reception application 252 based on processing of the telemetry messages 230 and test messages 234. Further, the routing table includes an entry for each pathway that indicates whether the pathway is available or in service as may be determined by the maintenance module 218 by interfacing with an operating system of the monitored system 210 or by other techniques. When a pathway is not in service or available, it will not be selected by the telemetry message generator 214 for transferring telemetry messages 230 to the destination system 250. Different table arrangements may be utilized to practice the invention to provide message transmission information or parameters for pathways between applications to the source or telemetry message generator 214 for use in selecting a pathway for new messages 230.

TABLE 1

| Entry # | Exit Path | Destination Point | Current Latency (ms) | Current Throughput (bps) | In Service (boolean) |
|---|---|---|---|---|---|
| 1 | 10.100.0.1 | 172.16.0.1 | 72 | 1544000 | True |
| 2 | 10.100.0.1 | 172.32.0.1 | 107 | 10000000 | True |
| 3 | 10.200.0.1 | 172.16.0.1 | 90 | 512000 | True |
| 4 | 10.200.0.1 | 172.32.0.1 | 118 | 1544000 | True |

Figure 4:
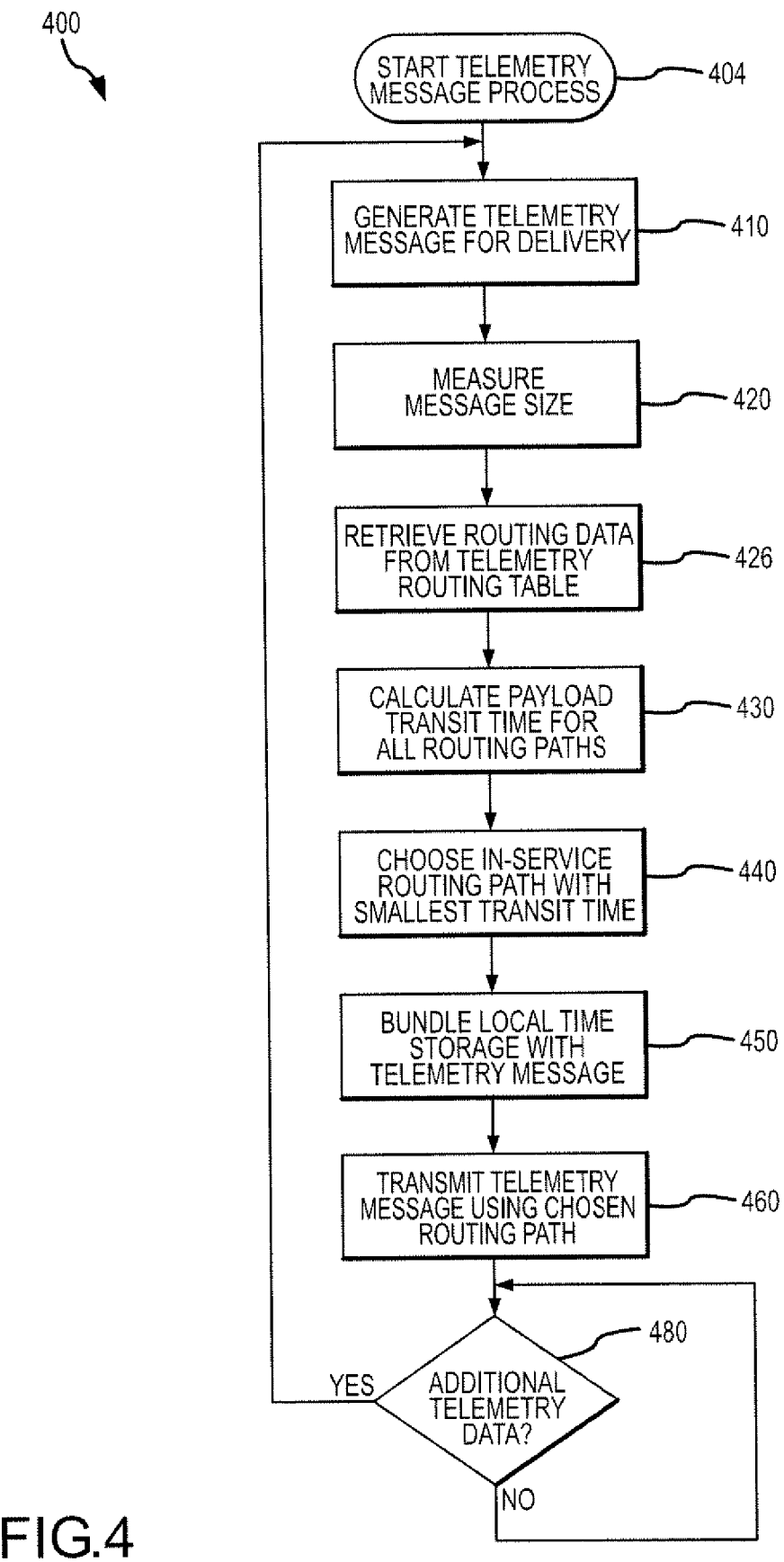
FIG. 4 illustrates a telemetry message generation process of one embodiment of the invention such as may be performed by the telemetry and/or other applications running on the monitored system or site of the system of FIG. 2.

To further explain the monitoring and optimization features of the invention, it may be useful to provide more detailed explanation of operation of the telemetry application or source 212 and the telemetry reception application 252. FIG. 4 illustrates processes performed at the monitored or source system 210 such as by message generator 214 and transit time calculator 216 with access to telemetry routing table 222. The process 400 starts at 404 such as with initialization or providing of the routing table 222 and providing the generator 214 and calculator 216 as part of the application 212 or as separately running modules on the system 210 or in communication with the application 212. At 410, the message generator 214 generates a telemetry message 230 for delivery to a reception application 252, and this message 230 typically includes a data or telemetry payload which may range widely in size. At 420, the size of the message 230 is determined (e.g., "message size") and includes at least the size of the payload and this is typically measured in bytes by the generator 214 or the transit time calculator 216. At 426, the routing data or parameters for each available route or pathway is retrieved from the routing table 222 by the generator 214 or calculator 216.

For example, the telemetry routing table (or TRT) may be consulted or accessed to retrieve the exit path (e.g., an IP address defining the exit path), a paired destination point (e.g., an IP address for a delivery interface at the destination system 250) (and these two IP addresses may be thought of as parts 1 and 2 of a two part key defining the routes between the two applications). Additionally, the retrieved or accessed data may include a current latency value (e.g., milliseconds) and current throughput (e.g., in bits per second) for each route or pathway. Further, the table may be accessed to verify that each route is available for use, e.g., has a "True" or "Yes" Boolean value for its "in_service" parameter or variable as shown in Table 1. The transit time calculator 216 then acts to calculate the payload or message transit time for all routing paths at 430 or at least for those that are listed as in service or available for messaging. The calculator 216 calculates the transit time for all combinations of exit path and destination point in the example provided by Table 1, and this calculation is performed based on latency, throughput values, and also message size. For example, the calculator 216 may divide the message size by the current throughput and then add the current latency for the path to determine the transit time for the message on a particular path. A table of such values may then be prepared or the determined transit times otherwise made available to the telemetry message generator 214.

At 440, generator 214 uses these determined transit times to choose or elect a preferred routing path for the message 230, such as by selecting the route or pathway with the smallest or shortest transit time for the telemetry packet. At 450, the message generator 214 acts to bundle or include a local timestamp with the telemetry message along with the address or pathway definition (e.g., paired exit path and destination point or IP or other network addresses). At 460, the telemetry message 230 is transmitted using the selected communication route or path. This may involve the application layer injecting the telemetry message into the presentation layer (or layer 6) as shown in FIG. 3 using the exit path selected. At 480, the method 400 continues with determining if there are additional telemetry data to be transmitted and if so, then continuing at 410.

Table 2 illustrates results of performing transit time determinations for two messages having different payloads and using the transmission parameters for the 4 routing paths shown in Table 1. As shown, the first message has a size of 2048 bytes and based on this size, the current throughputs of the paths, and the associated latency overhead values the first of the four routes or paths provides the fastest routing path (based on the fastest possible end-to-end delivery time using past but recent delivery performance results for latency and throughput). However, the second message has a much larger size (i.e., 65,636 bytes), and the calculated total telemetry time is shorter or smaller for the second of the four possible paths or routes and not the first path as was the case for the smaller sized message. This example is significant in that it shows that the "largest pipe" or connection with the largest throughput will not necessarily provide the shortest or best path for all messages. In this case, the relatively small size of the first message and the latencies results in the smaller message being delivered to the pipe or route with a much smaller throughput (bandwidth measured in bps). However, the "least latent" connection (e.g., a T-1 or similar connection in some cases) is also not always the fastest or best selection for a message because as the message size reaches a certain size the throughput or bandwidth becomes more relevant.

252 acts to receive the entire message payload (which may be stored at 262 in memory 260), closing the socket, and noting or determining the time (e.g., time of completion of receiving of message 230 based on system clock), which may be thought of as the "receipt_end_timestamp."

At 540, the telemetry stream analysis module 254 (and/or reception application 252) un-packages the message and determines telemetry stream characteristics or data points for the received telemetry message 262. For example, these data points may include the current latency and current throughput. The current latency is typically determined by subtracting the delivery timestamp bundled into the message by the source or message generator 214 from the time the message was initially received at the delivery interface 251 or by the application 252 (e.g., less the receipt_start_timestamp). The current throughput is generally determined by dividing the message payload in bytes by the time taken to receive the message (e.g., the receipt_end_timestamp less the receipt_start_timestamp). At 550, the maintenance message generator 256 (or application 252) acts to generate and transmit a maintenance message (such as message 238) to the source of the telemetry message (i.e., the telemetry application 212). In this manner, the application 252 communicates these telemetry stream values (e.g., current latency, current throughput, and the like) to the maintenance process 218 running on the telemetry source 210. At 560, the method 500 determines whether the received message 262 was a test message 234 and if so, the message is discarded at 570 and the application waits for a new message at 510. If not a test message but instead a telemetry message 230, the message is passed at 580 to telemetry processing logic (not shown) in the application 252 (or in a separate application(s)). As can be seen, the test messages 234 typically are sent to obtain the current latency and current throughput for paths such as paths that have not been used recently or for a set period for telemetry streams.

TABLE 2

| Sample payload | 2048 | | | |
|---|---|---|---|---|
| Message Size (bytes) | 2048 | 2048 | 2048 | 2048 |
| Latency (s) | 0.072 | 0.107 | 0.090 | 0.118 |
| Throughput (bps) | 1544000 | 10000000 | 512000 | 1544000 |
| Transit time | 0.00133 | 0.00020 | 0.00400 | 0.00133 |
| Latency overhead | 0.07200 | 0.10700 | 0.09000 | 0.11800 |
| Total telemetry time (s) | 0.07333 | 0.10720 | 0.09400 | 0.11933 |
| Total telemetry time (ms) | 73.33 | 107.2 | 94 | 119.33 |
| Sample payload | 65536 | | | |
| Message Size (bytes) | 65536 | 65536 | 65536 | 65536 |
| Latency (s) | 0.072 | 0.107 | 0.090 | 0.118 |
| Throughput (bps) | 1544000 | 10000000 | 512000 | 1544000 |
| Transit time | 0.04245 | 0.00655 | 0.12800 | 0.04245 |
| Latency overhead | 0.07200 | 0.10700 | 0.09000 | 0.11800 |
| Total telemetry time (s) | 0.11445 | 0.11355 | 0.21800 | 0.16045 |
| Total telemetry time (ms) | 114.45 | 113.55 | 218 | 160.45 |

Figure 5:
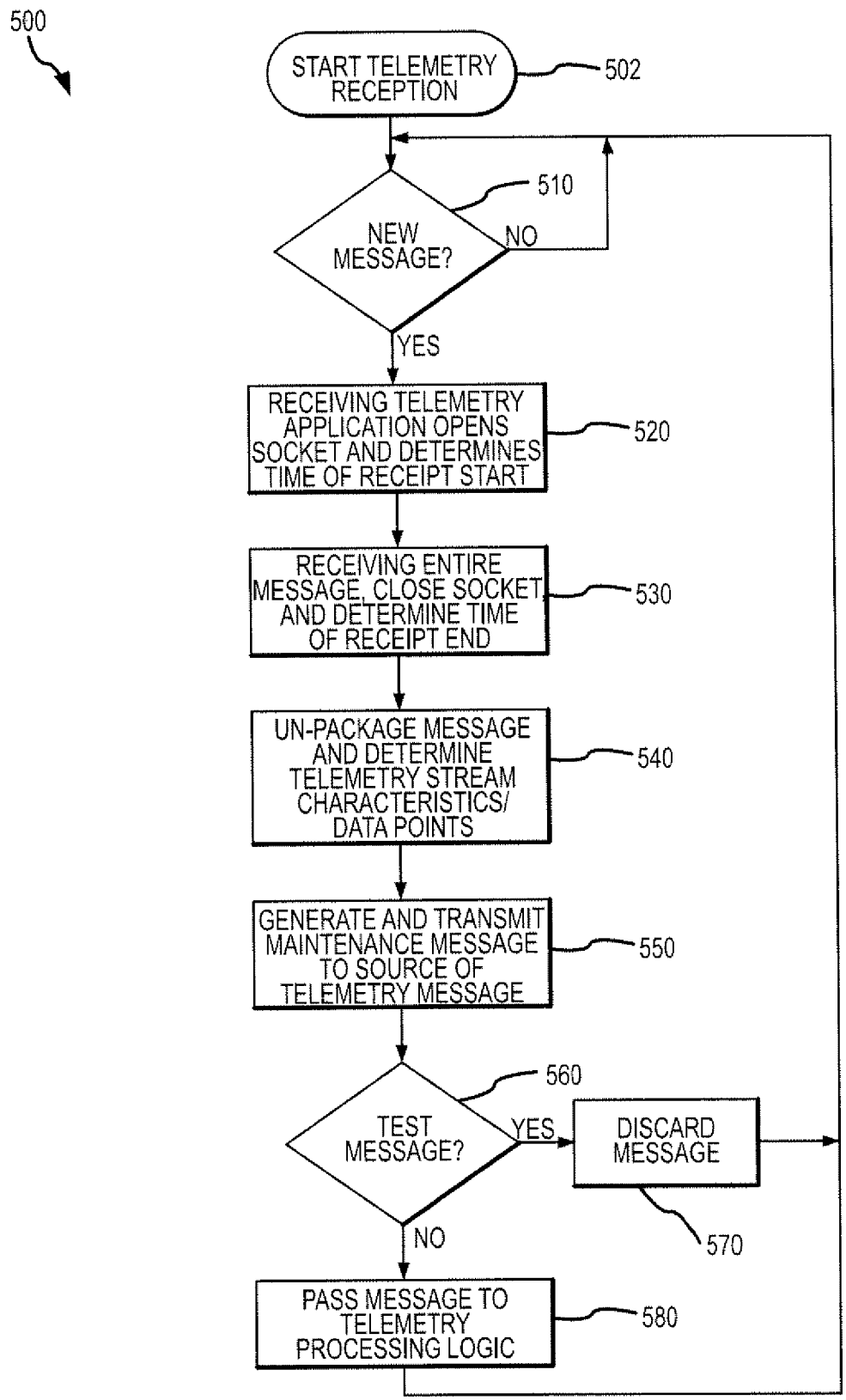
FIG. 5 illustrates telemetry message reception and processing according to embodiments of the invention such as may be performed by the telemetry reception application shown in FIG. 2.
Figure 6:
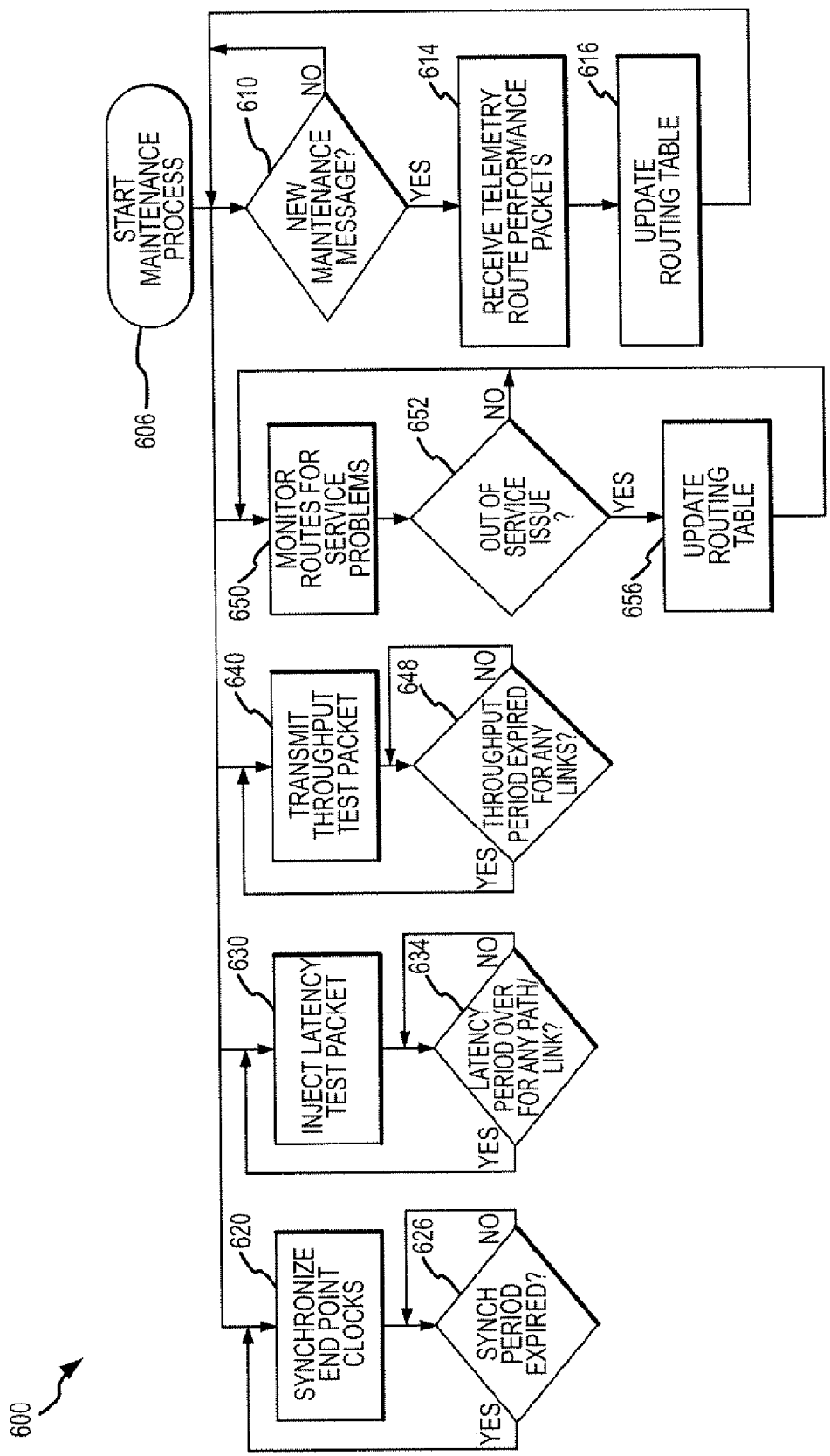
FIG. 6 is a flow diagram for a processes that are performed by one implementation of a maintenance module of the present invention, such as the module shown as part of the telemetry source application of FIG. 2.

FIG. 5 illustrates processes 500 performed by the telemetry reception application 252 of the system 200. At 502, the process 500 begins such as with providing the telemetry stream analysis module 254 as part of the reception application 252 or running separately but being accessible by the application 252. At 510, the method 500 includes determining whether a new telemetry message 230 is being received. If yes, then the process 500 continues at 520 with the reception application 252 opening a socket and determining or noting the time (e.g., time of receipt of message 230 based on a system 250 clock (not shown)), which may be thought of as the "receipt_start_timestamp." At 530, reception application FIG. 6 illustrates processes 600 carried out by maintenance module 218 (or application 212). The method 600 starts at 606 such as by providing the maintenance module 218 as part of application 212 or as a separate module running on system 210 or on a device accessible by system 210. The startup at 606 may also include setting an initial test period for synchronizing the clock used by application 212 and the clock used by application 252, for testing latency on a path, and for checking throughputs on a path. At 610, the method 600 continues with a determination of whether a new maintenance message 238 is received by the application 212. If yes, at 614, the telemetry route performance information or packets in the message 238 are received or accessed, and at 616, the maintenance module 218 acts to update the route records 226 in the telemetry routing table 222 for the corresponding path (such as by changing the current latency value or the current throughput for that path or exit path/destination point pair).

In parallel, the maintenance module 218 may act at 620 to synchronize endpoint clocks used by source and target applications 212, 252 and then at 626 to determine if a synchronization period has expired (e.g., to perform this synchronization in a loop such as a loop of 60 minutes or some other useful period). Also, in parallel, the method 600 may include at 630 injecting a latency test packet (such as test message 234 that may be 64 bytes or some other useful size). This is a loop that is repeated as shown at 634 whenever a latency period (such as every 10 minutes or some other time period that may be set to suit a particular system 200 or monitored customer) expires and the link or path has not been utilized within that period for a telemetry message. Further in parallel, the method 600 may include having the maintenance module 218 transmitting a throughput test packet such as test message 234 at 640 whenever it is determined at 648 that a throughput period (such as 120 minutes or other period) has expired for a link or path and the path has not been used for telemetry streams. Each of these last two loops are useful for causing a maintenance message 238 to be generated by reception application 252 so as to be able to update information in the routing table 222 allowing acceptably current or fresh data to be used in selecting paths or routes for telemetry messages in system 200. Yet further in parallel, the maintenance module 218 may act at 650 to monitor routes for service problems and if a route or path is determined to be out of service at 652 acting to update the routing table at 656 to show the route or pathway is out of service (i.e., not "In Service" as shown in Table 1). For example, the module 218 may be integrated with an operating system of system 210 via API calls for indications that network connectivity is impaired on an interface. If so, all telemetry routing table entries with a matching exit path would be marked as out of service (or "In Service" equal to false or no in Table 1). Reverse operations would occur if an interface later becomes available (and such new availability may be used to trigger (not shown) performance of steps 630 and 640 to test latency and throughput for the now available paths).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A system for controlling communications between two applications, comprising:
   a source application running on a first computer system;
   a destination application running on a second computer system, wherein the first and second computer system are linked by a network;
   a routing table defining a plurality of routes for communications between the source application and the destination application, each of the routes being defined by an exit path for the source application from the first computer system and a delivery interface for the destination application at the second computer system, wherein the source application generates a message having a size and wherein the source application selects one of the routes for transmission of the message based on the size and based on transmission performance parameters stored in the routing table for the routes; wherein the transmission performance parameters comprise throughput values for each of the routes and wherein the source application selects the one of the routes by determining a transit time for the message based on a quotient of the message sizes and throughput values.

2. The system of claim 1, wherein the source application is a telemetry data generation application and the size of the message comprises telemetry data and wherein the destination application comprises a telemetry reception application.

3. The system of claim 1, wherein the exit path and the delivery interface are each defined in the routing table with network addresses, whereby the selected route for transmission comprises the network address of one of the exit paths and the network address of one of the delivery interfaces.

4. The system of claim 1, wherein the throughput values stored in the routing table for the routes are values determined for prior messages transmitted on each of the routes between the source application and the destination application.

5. The system of claim 1, wherein the transmission performance parameters further comprise a latency for each of the routes and wherein the transit time for each of the routes further includes the corresponding latency.

6. The system of claim 5, wherein the latency stored in the routing table for the routes are latencies determined for prior messages transmitted on each of the routes between the source application and the destination application.

7. The system of claim 1, wherein the transmission performance parameters comprise an availability parameter indicating whether the route is available for transmitting the message and wherein the source application only considers the routes for which the availability parameter indicates the route is in service.

8. A telemetry communication method, comprising:
   storing a telemetry routing table in memory having entries for a plurality of communication pathways for delivering a telemetry message from a telemetry application running on a first computer system to a telemetry reception application running on a second computer system accessible by the first computer system via one or more communications networks, wherein each of the entries comprises a latency and a measured data delivery rate;
   with the telemetry application, generating a telemetry message with a data payload;
   selecting one of the communication pathways using the telemetry application; and
   with the telemetry application, injecting the telemetry message into the presentation layer of network protocol using the selected one of the communication pathways,
   wherein the selecting comprises determining a transit time for the data payload for each of the communication pathways based on the size of the data payload and the data delivery rate and based on the latency and wherein the selected one of the communication pathways has a shortest one of the determined transit times.

9. The method of claim 8, further comprising periodically determining whether each of the communication pathways is available for data transmission and storing the determined availability in the corresponding entries in the telemetry routing table and wherein the selecting further comprises considering only communication pathways with positive ones of the determined availabilities.

10. The method of claim 8, wherein each of the communication pathways is defined in the telemetry routing table by an exit path and a destination point.

11. The method of claim 10, wherein each of the entries includes a first network address for the exit path and a second network address for the destination point and wherein the first network address corresponds to the first computer system and the second network address corresponds to the second computer system.

12. The method of claim 8, further comprising operating the telemetry application to insert a timestamp in the telemetry message.

13. The method of claim 8, further comprising with the telemetry reception application, receiving the telemetry message, determining a latency and a data delivery rate for the received telemetry message, and providing the determined latency and data delivery rate to the telemetry application.

14. The method of claim 13, further comprising updating the entry for the selected one of the communication pathways using the determined latency and data delivery rate from the telemetry reception application, whereby transmission performance data for selected or utilized ones of the communication pathways is periodically updated.

15. A method of selectively transmitting a message between applications, comprising:

generating a payload of digital data for a message with a source application for delivery to a destination application;

measuring a size of the payload;

accessing a routing table in memory to determine available communication paths from the source application to the destination application and for each of the available communication paths, stored values for transmission latency and data delivery rate;

determining a transit time for the payload for each of the available communication paths based on the size of the payload and the values for transmission latency and data delivery rate;

selecting one of the available communication paths based on the determined transit times; and transmitting the message using the selected one of the available communication paths.

16. The method of claim 15, wherein for each of the available communication paths the routing table comprises a network address for an exit path from a system running the source application to a communications network and a network address for a delivery interface for the destination application.

17. The method of claim 15, further comprising prior to transmitting the message bundling a timestamp using a clock local to the source application in the message.

18. The method of claim 15, wherein the transmitting of the message comprises injecting the message into a presentation layer of a network protocol using the source application at an application layer of the network protocol based on an exit path defined in the selected one of the available communication paths.

19. The method of claim 15, further comprising after transmitting the message, receiving the transmitted message with the destination application and generating a maintenance message for delivery to the source application, the maintenance message including a latency and a data delivery rate for the selected one of the available communication paths.

* * * * *